(12) United States Patent
Li et al.

(10) Patent No.: US 10,576,837 B2
(45) Date of Patent: Mar. 3, 2020

(54) ELECTRICAL DRIVE UNIT

(71) Applicant: GM GLOBAL TECHNOLOGY OPERATIONS LLC, Detroit, MI (US)

(72) Inventors: Dongxu Li, Troy, MI (US); Chengwu Duan, Shanghai (CN); Chunhao J. Lee, Troy, MI (US); Lei Hao, Troy, MI (US); Norman K. Bucknor, Troy, MI (US); Michael A. Potter, Grass Lake, MI (US); Farzad Samie, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/032,180

(22) Filed: Jul. 11, 2018

(65) Prior Publication Data

US 2020/0016986 A1    Jan. 16, 2020

(51) Int. Cl.
| | |
|---|---|
| *B60L 15/00* | (2006.01) |
| *B60W 20/15* | (2016.01) |
| *B60W 10/08* | (2006.01) |
| *B60K 6/26* | (2007.10) |
| *B60W 10/02* | (2006.01) |
| *B60L 50/16* | (2019.01) |
| *B60L 15/20* | (2006.01) |
| *F16H 37/08* | (2006.01) |

(52) U.S. Cl.
CPC ............. *B60L 15/007* (2013.01); *B60K 6/26* (2013.01); *B60L 50/16* (2019.02); *B60W 10/023* (2013.01); *B60W 10/08* (2013.01); *B60W 20/15* (2016.01); *F16H 37/0826* (2013.01); *B60L 15/2054* (2013.01); *B60W 2510/081* (2013.01); *B60W 2710/083* (2013.01)

(58) Field of Classification Search
USPC ..................... 290/27, 40 C; 701/70; 477/3, 4
See application file for complete search history.

(56) References Cited

U.S. PATENT DOCUMENTS

| | | | |
|---|---|---|---|
| 6,254,507 B1 * | 7/2001 | Downs ................... | B60K 6/383 477/4 |
| 6,307,277 B1 * | 10/2001 | Tamai ...................... | B60K 6/26 290/40 C |
| 6,376,927 B1 * | 4/2002 | Tamai .................... | B60K 6/383 290/31 |
| 6,441,506 B2 * | 8/2002 | Nakashima ............ | B60K 6/365 123/179.1 |

(Continued)

*Primary Examiner* — Pedro J Cuevas
(74) *Attorney, Agent, or Firm* — Reising Ethington P.C.; Sten Schuler

(57) ABSTRACT

An electric drive unit is provided having an electric motor-generator coupled with a torque converter. Vehicles and machines employing the same, as well as methods of using the same, are also disclosed. The motor-generator may be configured to selectively drive a rotatable shaft with a motor output torque and generate electrical power from rotation of the rotatable shaft. The electric drive unit may further include a torque converter having an input and an output separated by a fluid coupling. The fluid coupling may be configured to selectively multiply torque received at the input such that a drive unit output torque at the output is selectively increased in at least a predetermined rotational speed range of the electric motor-generator.

20 Claims, 8 Drawing Sheets

(56) References Cited

U.S. PATENT DOCUMENTS

| | | | | |
|---|---|---|---|---|
| 6,506,139 B2* | 1/2003 | Hirt | | B60K 6/365 477/3 |
| 8,055,422 B2* | 11/2011 | Yurgil | | B60L 7/26 701/70 |
| 8,062,175 B2* | 11/2011 | Krueger | | B60K 6/365 477/29 |
| 8,190,344 B2* | 5/2012 | Krueger | | B60K 6/48 180/65.27 |
| 8,287,427 B2* | 10/2012 | Sah | | B60W 10/02 477/3 |
| 8,591,378 B2* | 11/2013 | Matsubara | | B60K 6/445 477/3 |
| 8,836,187 B2* | 9/2014 | Iwase | | B60K 6/26 310/78 |
| 9,643,595 B2* | 5/2017 | Imamura | | B60K 6/442 |
| 9,738,161 B2* | 8/2017 | Goodman | | B60L 3/04 |
| 9,758,159 B2* | 9/2017 | Imamura | | B60K 6/442 |
| 9,856,974 B2* | 1/2018 | Knoth | | F16H 61/0267 |
| 10,260,613 B2* | 4/2019 | Lahr | | F16D 41/08 |
| 10,288,159 B2* | 5/2019 | Li | | F16D 13/40 |
| 10,293,674 B1* | 5/2019 | Wilton | | B60K 6/48 |
| 10,323,696 B2* | 6/2019 | Samie | | F16D 41/125 |
| 10,337,597 B2* | 7/2019 | Samie | | |
| 10,358,123 B2* | 7/2019 | Lee | | B60L 7/18 |
| 2001/0020789 A1* | 9/2001 | Nakashima | | B60K 6/365 290/40 C |
| 2002/0082134 A1* | 6/2002 | Hirt | | B60K 6/365 477/3 |
| 2008/0318727 A1* | 12/2008 | Matsubara | | B60K 6/445 477/3 |
| 2010/0036575 A1* | 2/2010 | Yurgil | | B60L 7/26 701/70 |
| 2011/0300990 A1* | 12/2011 | Swales | | B60K 6/48 477/4 |
| 2012/0217830 A1* | 8/2012 | Iwase | | B60K 6/26 310/78 |
| 2014/0031158 A1* | 1/2014 | Hemphill | | B60W 20/10 475/5 |
| 2014/0088813 A1* | 3/2014 | Kobayashi | | B60K 6/547 701/22 |
| 2014/0129115 A1* | 5/2014 | Teraya | | F02D 41/0225 701/103 |
| 2016/0231713 A1* | 8/2016 | Goodman | | B60L 3/04 |
| 2017/0067558 A1* | 3/2017 | Knoth | | F16H 61/0267 |
| 2017/0328455 A1* | 11/2017 | Li | | F16D 13/40 |
| 2017/0328456 A1* | 11/2017 | Samie | | F16D 1/104 |
| 2018/0355923 A1* | 12/2018 | Samie | | F16D 41/125 |
| 2018/0355962 A1* | 12/2018 | Lahr | | F16D 41/08 |
| 2019/0061737 A1* | 2/2019 | Goto | | B60W 20/30 |
| 2019/0107187 A1* | 4/2019 | Lahr | | F16D 41/08 |
| 2019/0168731 A1* | 6/2019 | Lee | | B60L 50/16 |
| 2019/0232941 A1* | 8/2019 | Wang | | B60W 10/023 |
| 2019/0299964 A1* | 10/2019 | Lee | | B60L 50/61 |

* cited by examiner

ELECTRICAL DRIVE UNIT

Electrical motors are employed in vehicles as primary sources of motive power for the vehicle, e.g., in battery electric vehicles (BEVs), or as complements to other power sources such as internal combustion engines, e.g., in hybrid vehicles. Electric motor-generator units (MGUs) typically provide a relatively high torque output at low motor speeds in comparison to internal combustion engines of comparable power outputs, and as such MGUs are useful for providing "low-end" power for a vehicle. Nevertheless, MGUs are typically a relatively expensive and heavy component of a vehicle powertrain, especially where greater torque and/or power output is desired.

Accordingly, there is a need for an electric drive that provides desired torque and power outputs, while offering reduced weight and cost.

SUMMARY

In at least some example illustrations, an electric drive unit is provided having an electric motor-generator configured to selectively drive a rotatable shaft with a motor output torque and generate electrical power from rotation of the rotatable shaft. The electric drive unit may further include a torque converter having an input and an output separated by a fluid coupling. The input may be coupled to the rotatable shaft such that an input torque applied to the input is substantially equal to the motor output torque. The fluid coupling may be configured to selectively multiply torque received at the input such that a drive unit output torque at the output is selectively increased in at least a predetermined rotational speed range of the electric motor-generator.

Optionally, the torque converter includes a lockup clutch configured to selectively prevent slip between rotational speeds of the input and the output.

The electric drive unit, in some examples, may also include an output shaft driven by the output of the torque converter.

In other examples of an electric drive unit, the drive unit may include an electric motor-generator configured to selectively drive a rotatable shaft with a motor output torque and generate electrical power from rotation of the rotatable shaft. The electric drive unit may further include a torque converter having an input and an output separated by a fluid coupling. In these examples, the input may be directly coupled to the rotatable shaft, with the fluid coupling being configured to selectively multiply torque received at the input such that a drive unit output torque at the output is selectively increased in at least a predetermined rotational speed range of the electric motor-generator.

Optionally, the torque converter may include a lockup clutch configured to selectively prevent slip between rotational speeds of the input and the output.

Some example approaches to an electric drive unit may include an output shaft driven by the output of the torque converter.

Optionally, the input of the torque converter may be directly coupled to the rotatable shaft for synchronized rotation therewith.

Example illustrations are also provided of a vehicle comprising either of the electric drive units described above. Example vehicles may be a battery-electric vehicle, where the electric drive unit is configured to provide motive force to a vehicle drivetrain of the vehicle. In other examples, the vehicle may be a hybrid vehicle having an internal combustion engine configured to provide motive force to a vehicle drivetrain of the vehicle or generate electrical power for the vehicle.

In some examples of a vehicle, the electric drive unit may be a dedicated powertrain of the vehicle with the torque converter input driven solely by the electric motor-generator.

Example illustrations are also provided which are directed to a machine having an electric drive unit, as described above.

Examples are also provided of a method, which includes providing an electric motor-generator configured to selectively (a) drive a rotatable shaft with a motor output torque and (b) generate electrical power from rotation of the rotatable shaft. The method may further include applying an input torque substantially equal to the motor output torque from the rotatable shaft to a torque converter input coupled to the rotatable shaft, with the torque converter input being separated from a torque converter output by a fluid coupling. The method may further include transmitting a drive unit torque from the torque converter output to a final drive unit, and multiplying torque received at the torque converter input to increase the drive unit torque at the output in at least a first rotational speed range of the electric motor-generator.

Some example methods may also include equalizing torque from the torque converter input to the torque converter output in a second rotational speed range of the electric motor-generator that is higher than the first rotational speed range of the electric motor-generator. In these examples, the torque may be equalized from the torque converter input to the torque converter output by temporarily fixing the torque converter input and output for rotation together with a lockup clutch.

In some example methods, torque may be multiplied across the torque converter during a vehicle launch from a stop.

Some example methods may also include idling the electric motor during a vehicle stop prior to the vehicle launch.

In at least some example approaches, the torque converter input may be maintained at a first rotational speed above zero during a vehicle stop prior to a vehicle launch.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Figure 1:
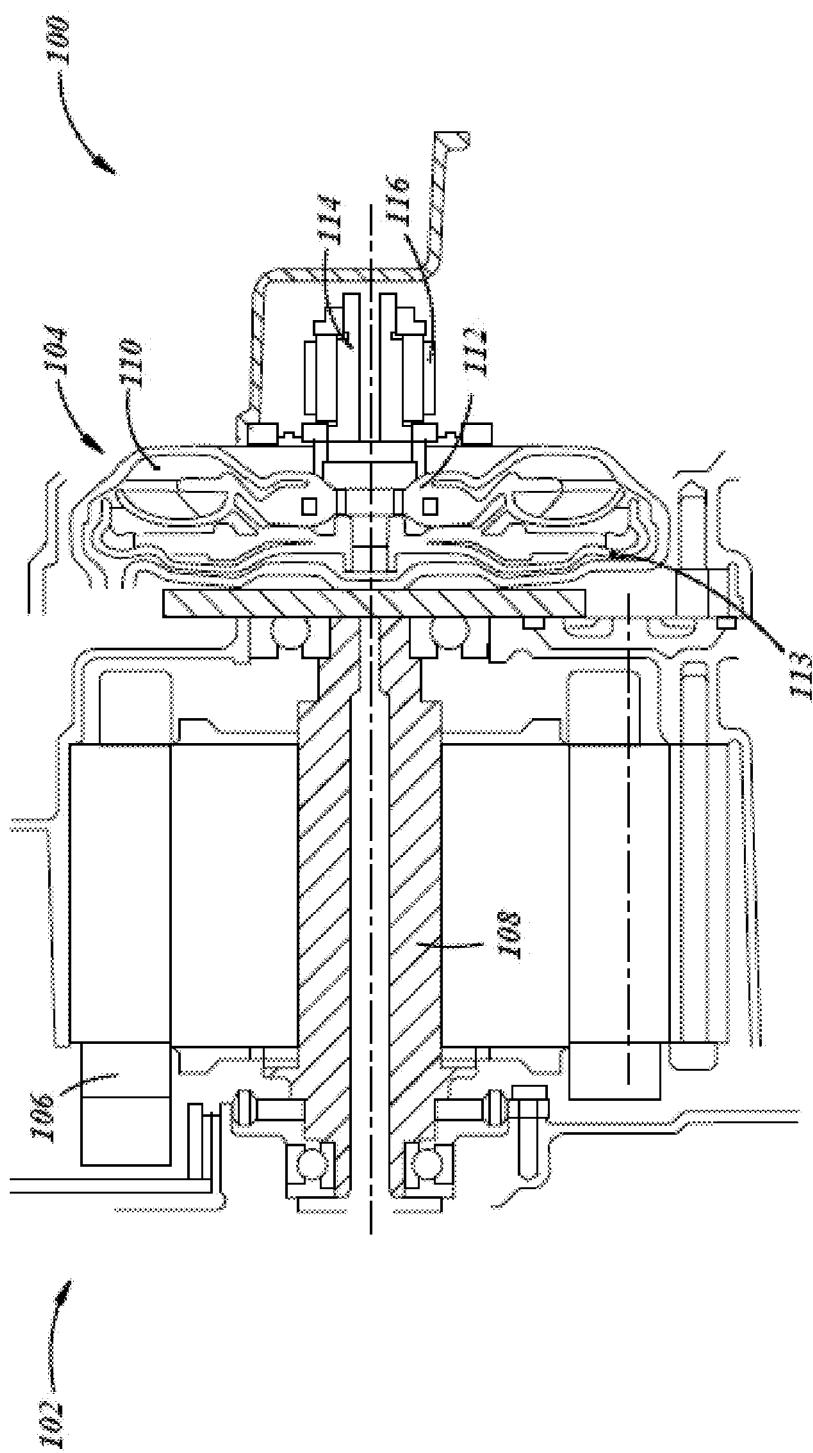
FIG. 1 is a partial section view of a torque converter for an electrical drive for use in a vehicle or machine, according to an example.

According to example illustrations herein, an electric drive unit, e.g., an electric motor-generator, may be paired with a torque converter comprising a fluid coupling that is configured to selectively multiply torque of the motor-generator unit in a desired speed range of the motor-generator. In this manner, a vehicle or generator relying at least in part upon the motor-generator may employ a relatively smaller or less powerful motor-generator, relying in part upon torque multiplication characteristics of the torque converter to provide adequate torque during vehicle launch or otherwise at lower motor speeds, while reducing overall size and cost of the motor-generator. More specifically, by multiplying torque with a torque converter at lower motor speeds, a motor-generator with a lower power output (and corresponding lower size, weight, and/or cost) may be used as compared with previous approaches. Performance at higher motor speeds may also not suffer compared with larger motor-generators, as the primary limiting factor for electric motor-generators is typically low-speed torque requirements, and not high-speed power output. Example electric drives may employ a torque converter having a lockup clutch to prevent slip between input and output elements, thereby allowing slip to be eliminated across the torque converter when torque multiplication is not needed, e.g., at higher motor speeds. While the addition of a torque converter may require different operating methodologies for a vehicle or machine such as a stationary power generator, overall drivability of example electric drive systems remains relatively smooth and, at a minimum, equal to previous approaches to electric drive units, which lack a torque converter.

Some example torque converters disclosed in connection with electric drive units herein may be coupled directly to a rotatable shaft driven by an electric motor-generator. For purposes of this disclosure, a torque converter is directly coupled to a rotatable shaft when an input of the torque converter is either directly driven such that the rotatable shaft and input to the torque converter are formed together or otherwise in direct contact and concentric. In another example of a torque converter input being directly driven by a motor-generator, the rotatable shaft is coupled to the torque converter input by way of a fixed gearing. In other example illustrations, a torque converter input is coupled to the rotatable shaft such that an input torque applied to the torque converter input is substantially equal to the motor output torque. In still other examples, an electric drive unit functions as a contained powertrain, i.e., that provides propulsive force to a drivetrain alone through the torque converter and without the torque converter being directly driven by another power source, e.g., an IC engine.

Example electric drives may be employed in any application where an electric motor-generator is used to provide power. Electric drives as disclosed herein may be particularly well-suited for any application where torque output requirements—especially at low motor speeds—take precedence over peak power output. Example vehicles employing electric drives consistent with the disclosed examples may include battery electric vehicles (BEVs) relying solely upon an electric motor-generator to provide power for vehicle propulsion, or hybrid vehicles, i.e., vehicles employing an internal combustion (IC) engine for vehicle propulsion either alternatively or in addition to a motor-generator unit. Example electric drives may also be employed in heavy-duty vehicle applications such as mass transport vehicles, construction equipment, agricultural equipment, merely as examples. Additionally, a machine such as a stationary power generator, e.g., as may be provided for mills, conveyors, or factories, may benefit from the advantages associated with example electric drives having a torque converter. Accordingly, there is generally no limit to the potential applications for the examples disclosed herein.

Turning now to FIG. 1, example illustrations of electric drive units, e.g., for a vehicles or machine, will be described in further detail. As illustrated in FIG. 1, an example electric drive unit 100 may include an electric motor-generator unit (MGU) 102 that is coupled with a torque converter 104. MGU 102 may include a rotor 106 fixed for rotation about rotatable shaft 108. Accordingly, the MGU 102 may selectively drive the rotatable shaft 108 or generate electrical power from rotation of the shaft 108, e.g., during coasting of a vehicle associated with the electric drive unit 100.

The rotatable shaft 108 may be fixed at an end opposite the MGU 102 to a torque converter 104, such that rotation of the shaft 108 turns an input of the torque converter 104. For example, as illustrated in FIG. 1, the torque converter input may be a pump 110 which drives a turbine 112 via a fluid coupling. The pump/input 110 of the torque converter 104 is separated from the turbine/output 112 of the torque converter by a fluid coupling. The torque converter may have additional components not described in detail herein, but which are well known, that are configured to facilitate flow of fluid within the torque converter 104 in order to manage the fluid coupling between the input 110 and output 112. Merely as examples, the torque converter 104 may have a stator or other features formed within the torque converter 104 for selectively coupling the input 110 and output 112 for rotation together via the fluid coupling. The torque converter 104 may include a clutch 113 or other means for selectively locking the input 110 and output 112 together for rotation together without slip. For example, when the torque converter 104 reaches a threshold rotational speed of the input 110 and output 112, the clutch 113 may be actuated to synchronize rotational speeds of the input 110 and output 112, and/or generally eliminate slip between the input and output 112.

The torque converter 104 may selectively multiply torque output via the fluid coupling between the input 110 and output 112. An input torque applied to the input 110 may be substantially equal to a motor output torque of the MGU 102 transmitted by rotation of the shaft 108 to the input 110. The fluid coupling between the input 110 and output 112, particularly at relatively low rotational speeds of the MGU 102, may multiply torque received at the input 110 such that a drive unit output torque of the output 112 is increased. As will be discussed further below, this multiplication of torque across the torque converter, i.e., from the input 110 to the output 112, may be particularly useful in low speed ranges, such as when using the torque converter 104 to launch a vehicle from a stop. Accordingly, this torque multiplication in at least a predetermined rotational speed range of the MGU 102 may allow the usage of a relatively smaller MGU 102, as compared with previous approaches where a motor-generator drives an output directly, i.e., without the benefit of a torque converter.

The drive unit 100 may provide rotational output in any manner that is convenient. As illustrated in FIG. 1, the torque converter 104 may have an output shaft 114 driven by the output 112 of the torque converter 104. In one example. The output shaft 114 is fixed for rotation with the output 112. The output shaft 114 may in turn drive a vehicle drivetrain, final drive unit, or the like, e.g., by way of a gear 116 at an end of the shaft 114.

Figure 2A:
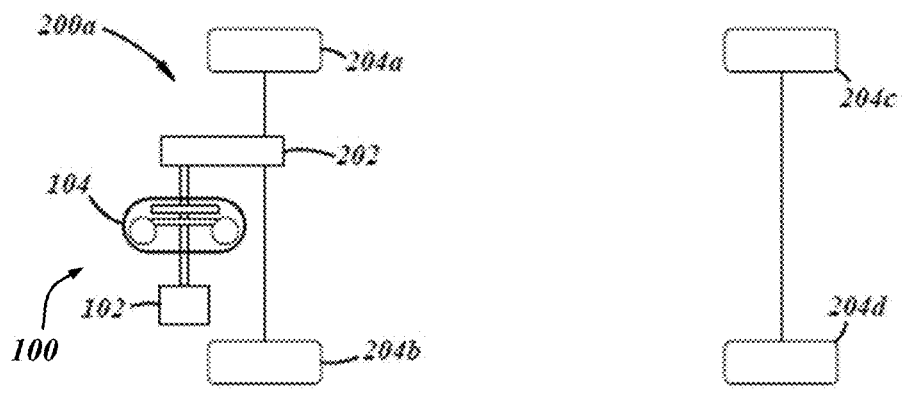
FIG. 2A is a schematic diagram of a hybrid vehicle and powertrain with the torque converter for an electrical drive of FIG. 1, according to one example approach.
Figure 2B:
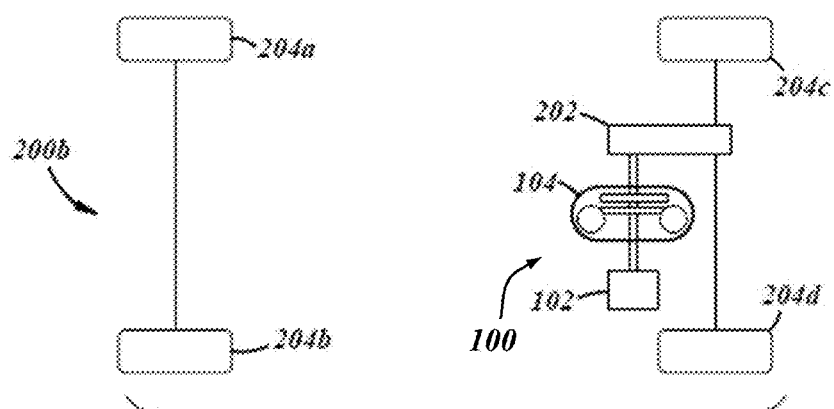
FIG. 2B is a schematic diagram of another example hybrid vehicle and powertrain with the torque converter for an electrical drive of FIG. 1.
Figure 2C:
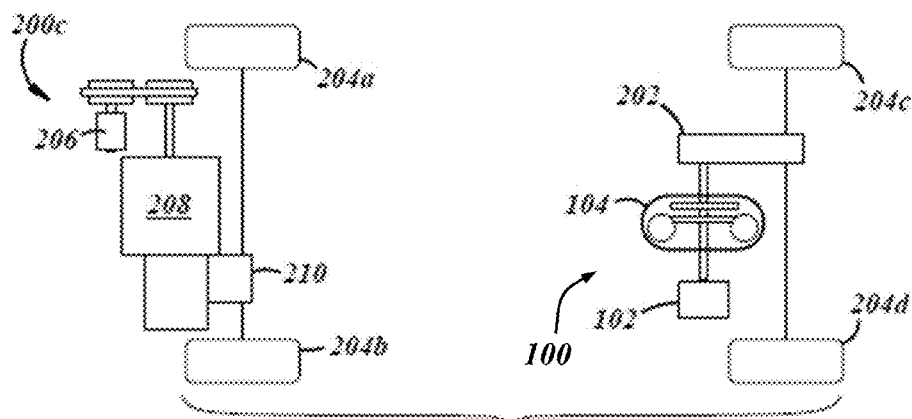
FIG. 2C is a schematic diagram of a hybrid vehicle and powertrain with the torque converter for an electrical drive of FIG. 1, according to another example.

Turning now to FIGS. 2A-2D, example applications for the electric drive unit 100 are described in further detail. In FIGS. 2A-2C, vehicles 200a, 200b, and 200c are illustrated schematically having an electric drive unit 100 utilized in various ways. As illustrated in FIGS. 2A and 2B, battery electric vehicles (BEVs) 200a and 200b each employ an electric drive unit 100 as the sole source of propulsion for the vehicle 200a, 200b. Accordingly, each MGU 102 drives a vehicle driveline 202 of the vehicles 200a, 200b via the torque converter 104. The driveline 202 may include a final drive unit, axle, and any other gears, transmissions, etc. that are convenient for providing propulsion for the vehicles 200a, 200b using the electric drive unit 100. The driveline 202 may drive front wheels 204a, 204b of a vehicle, as illustrated in FIG. 2A in connection with vehicle 200a, or rear wheels 204c, 204d of a vehicle, as illustrated in FIG. 2B in connection with vehicle 200b.

In another example illustrated in FIG. 2C, a vehicle 200c employs an electric drive unit 100 as the sole source of propulsion with respect to driveline 202 and/or rear wheels 204c, 204d. The vehicle 200c, however, is a hybrid vehicle having a dedicated driveline or powertrain for the front wheels 204a, 204b. More specifically, the vehicle 200c includes an internal combustion (IC) engine 208 driving a final drive unit 210 associated with front wheels 204a, 204b of the vehicle 200c. The vehicle 200c also includes a second motor-generator unit (MGU) 206 which provides propulsion for the front wheels 204a, 204b, either alternatively or in addition to that provided by the IC engine 208. The vehicle 200c may thus employ the electric drive unit 100 to drive the rear wheels 204c, 204d via driveline 202, either alternatively or in addition to that provided the front wheels 204a, 204b by way of the driveline 210 (using the IC engine 208 and/or MGU 206).

Figure 2D:
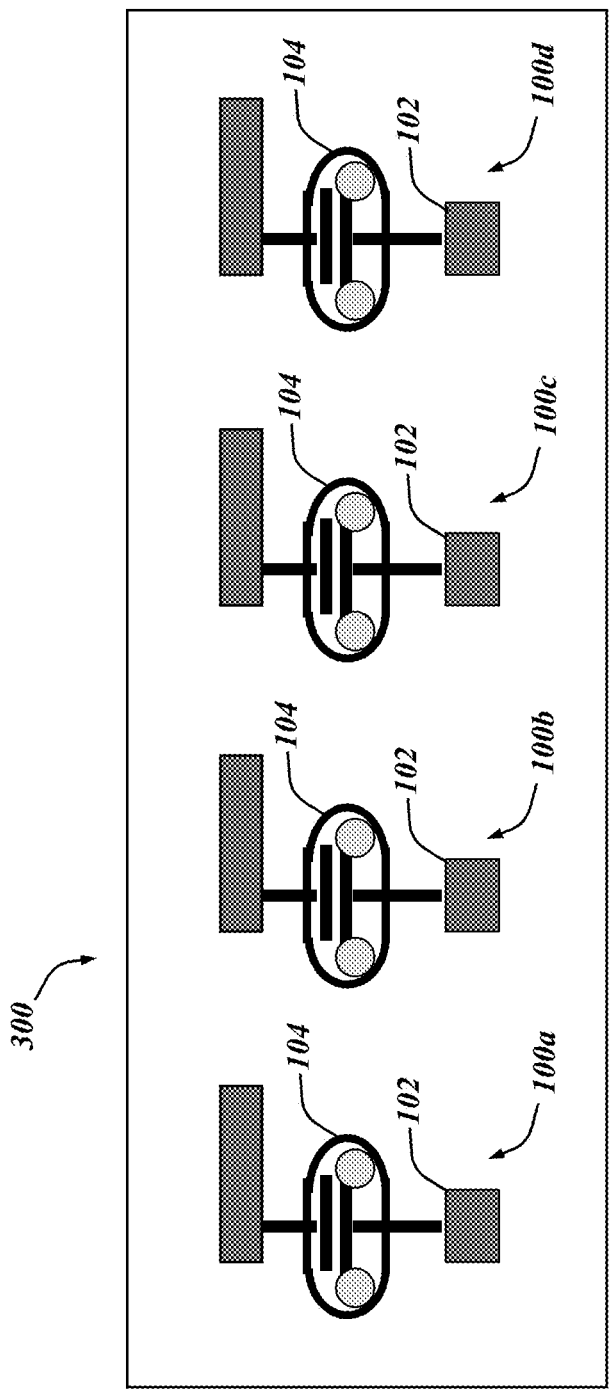
FIG. 2D is a schematic diagram of a machine with the torque converter for an electrical drive of FIG. 1, according to one example approach.

Turning now to FIG. 2D, a stationary generator 300 is illustrated employing one or more electric drive units 100a, 100b, 100c, 100d (collectively, 100). While four electric drive unit 100 are illustrated, it should be understood that any number of electric drive units 100 may be provided as needed for a given application. The stationary generator 300 may provide rotational motion as its output, e.g., by combining the efforts of one or more of the electric drive units 100 in a transmission (not shown), or may generate electrical power or other energy from the rotational power of the electric drive units 100.

Figure 3A:
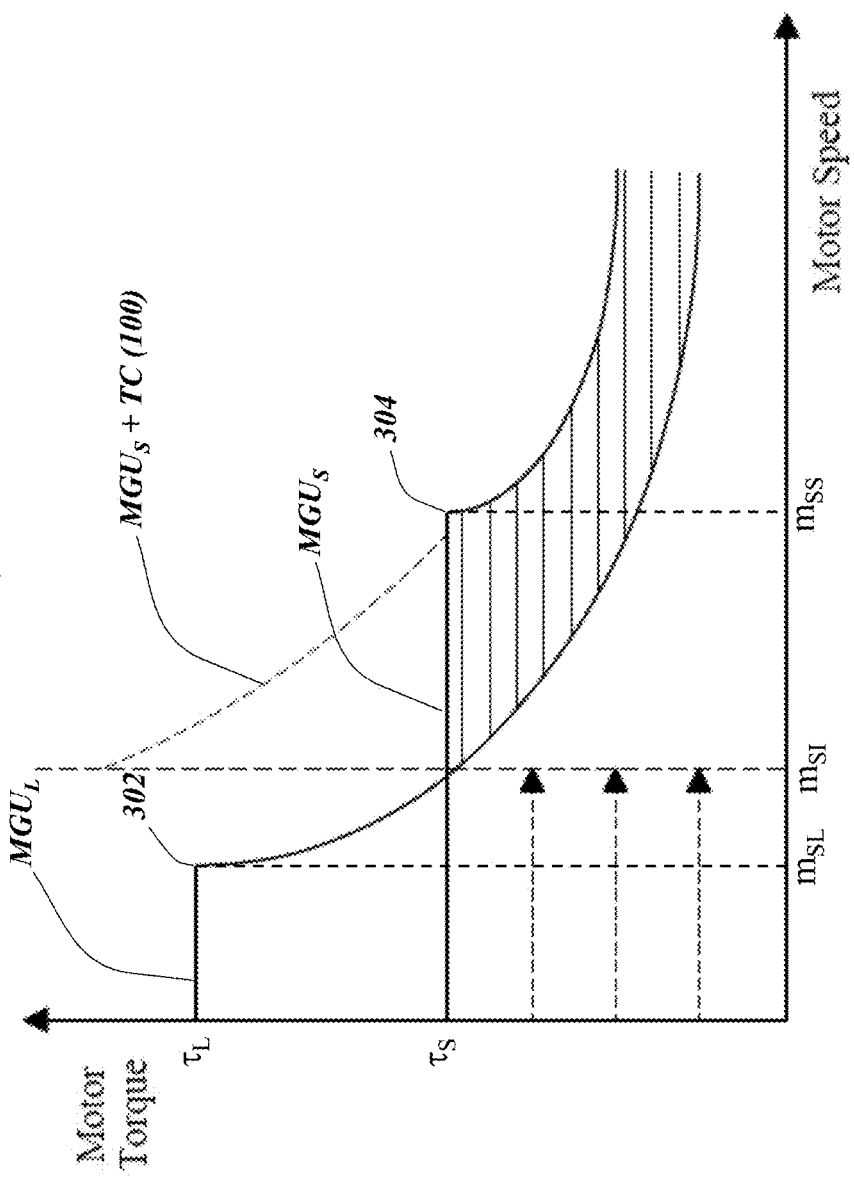
FIG. 3A is a graph of motor torque versus motor speed, including for the example torque converter for an electric drive of FIG. 1, according to one illustration.
Figure 3B:
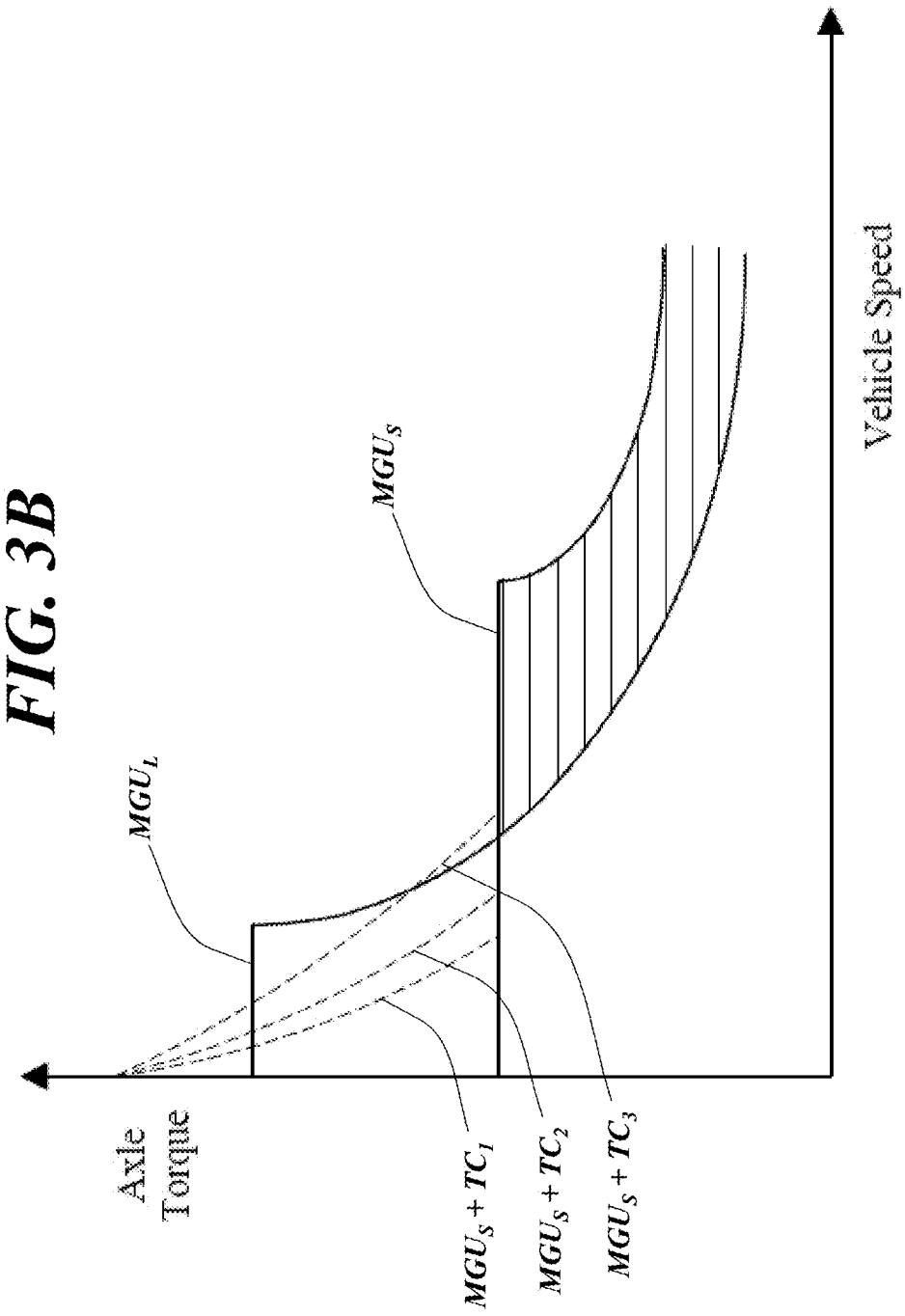
FIG. 3B is a graph of axle torque versus vehicle speed, including for the example torque converter for an electric drive of FIG. 1, according to an example.

Turning now to FIGS. 3A and 3B, operation of an example electric drive unit 100 is explained in further detail, and how certain factors of MGU 102 and torque converter 104 may influence design considerations. FIG. 3A illustrates motor torque output versus motor speed for a first motor-generator unit $MGU_S$ and a second motor-generator unit $MGU_L$ as a comparison of different size/power output motor-generator units. Generally, a larger or more powerful motor-generator unit will have a higher torque output at lower motor speeds, but a reduced peak torque output at higher motor speeds. Additionally, the motor speed at which torque output begins to decrease is higher for a smaller motor-generator unit.

Accordingly, FIG. 3A illustrates the larger motor-generator $MGU_L$ as having a higher motor torque output $\tau_L$ up to a threshold speed $m_{SL}$. In other words, the larger motor-generator $MGU_L$ provides greater torque from a stopped or zero motor speed. At point 302 on the graph, the torque output of the larger motor $MGU_L$ decreases upon further increased motor speed, generally following a constant power (and decreasing torque) provided at higher motor speeds. By comparison, the smaller motor-generator $MGU_S$ initially has a lower motor torque output Ts, however it is capable of maintaining that torque output up to a relatively higher threshold motor speed mss than that of the larger motor-generator unit. At point 304 on the graph, the torque output of the smaller motor MGUs decreases upon further increases in motor speed, following a constant power at higher motor speeds.

In view of the above, one challenge for powering a vehicle with an electric motor-generator unit is meeting peak torque requirements at low motor/vehicle speed, while also providing as flat a torque curve as possible at higher motor/vehicle speeds. This tradeoff may be reduced by pairing MGU 102 with torque converter 104 and using the torque multiplication properties of the torque converter 104 to provide increased torque at lower motor speeds. Accordingly, a relatively smaller MGU 102 may be employed that provides sufficient torque output at lower motor speeds, while also having a relatively flat torque curve, and sufficient peak power output at higher motor speeds.

It should be noted that the MGU 102 may need to be "idled" when a vehicle employing electric drive 100 is momentarily stopped, or the vehicle is otherwise about to launch from a stopped position. This is due to the need to keep the input 110 of the torque converter 104 turning generally below the stall speed of the torque converter 104. By contrast, traditional vehicles relying upon a motor-generator unit may generally allow the motor-generator unit to stop fully. By turning the MGU 102 at a relatively low speed $m_{SI}$, which is below the stall speed of the torque converter 104, the electric drive unit 100 may be ready to respond to a demand by the vehicle driver to drive the vehicle. More specifically, upon demand by the driver, the MGU 102 may increase speed, thereby immediately engaging the output 112 of the torque converter 104 through the fluid coupling as the speed of the input 100 is increased. In this manner, the example electric drives 100 may provide propulsion to the driveline 202 of a vehicle 200.

By "idling" the MGU 102 in this manner, as seen in FIG. 3A a resulting torque output curve for the electric drive unit 100 (represented by the dashed line indicated $MGU_S$+TC) may provide greatly increased torque output at low vehicle speeds while also providing a relatively flat overall torque curve at higher motor speeds. More specifically, as the vehicle accelerates from a stop (i.e., with the MGU 102 turning at "idle" speed $M_{SI}$) the torque output of the MGU is multiplied by the torque converter 104, resulting in a higher torque amount being available to propel the vehicle 200. Additionally, as the motor speed of the MGU 102 increases, the speeds of the input 110 and output 112 of the torque converter 104 may eventually be synchronized or locked via the clutch 113, at which point the torque output of the electric drive 100 is essentially identical to that of the MGU 102 (MGUs in FIG. 3A).

Turning now to FIG. 3B, it may be seen that different torque converters 104 may provide different torque curve characteristics when paired with a motor-generator unit, e.g., MGU 102. Generally, torque converters with greater torque multiplication capabilities may increase torque output of MGU 102 to a greater extent compared with otherwise comparable torque converters that have lower torque multiplication capabilities. Accordingly, three different torque converters 104 paired with MGU 102 may provide three different levels of an axle torque a given vehicle speed $v_S$ along their respective axle torque curves, as represented by the dashed lines for $MGU_S+TC_1$, $MGU_S+TC_2$, and $MGU_S+TC_3$. Nevertheless, each provides a greater axle torque than that of the MGU 102 by itself (i.e., without the multiplication effect of the torque converter 104), and at low, off-idle vehicle speeds also provides a greater axle torque than a larger motor-generator unit $MGU_L$ by itself (i.e., without the multiplication effect of the torque converter 104). Generally, it is desired to provide as much initial torque at low speeds as the large motor-generator unit ($MGU_L$).

Figure 4:
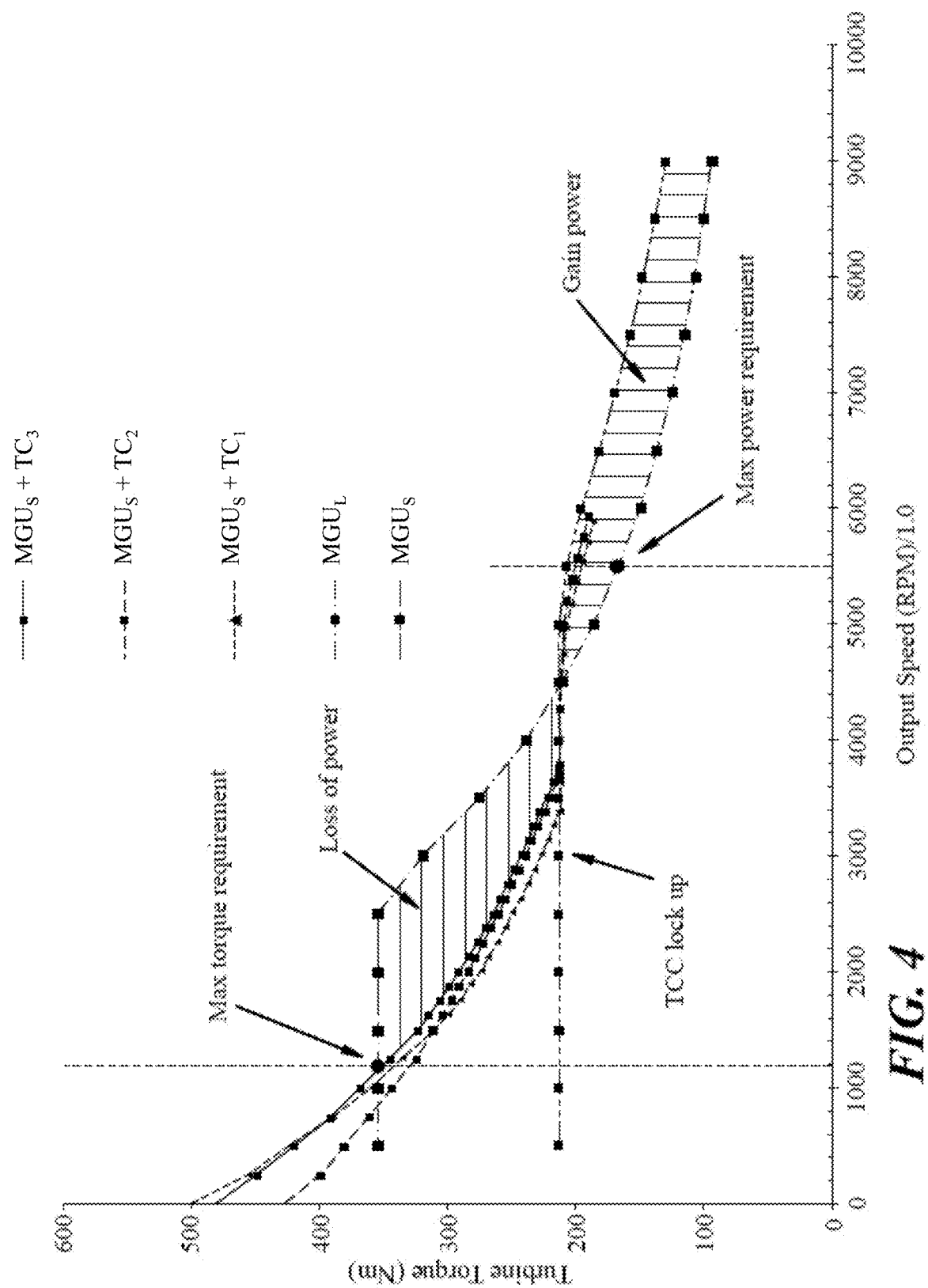
FIG. 4 is a graph of torque converter turbine torque versus output speed for the example torque converter for an electric drive of FIG. 1 compared with previous approaches to a motor-generator unit, according to one example approach.

Turning now to FIG. 4, examples of electric drive units consistent with the examples herein are illustrated in comparison to motor-generator units without a torque converter. In FIG. 4, a comparison is illustrated of output torque versus motor/turbine speed for two different motor-generator units of different sizes—i.e., a larger motor-generator unit $MGU_L$, and a smaller motor-generator unit $MGU_S$. As with the example provided in FIG. 3A, the smaller $MGU_S$ provides a torque output that is lower initially (i.e., at low motor speeds) than that of the larger $MGU_L$, and a higher level of power at higher motor speeds (in the example shown, above approximately 4500 RPM). Each of the three example electric drives employing a torque converter (i.e., "$MGU_S+TC_1$," "$MGU_S+TC_2$," and "$MGU_S+TC_3$") provide greater output torque at lower speeds as compared with the smaller $MGU_S$, although not as great as the larger $MGU_L$, as indicated by the "loss of power" region of the graph at lower motor output speeds. Nevertheless, the example electric drives employing torque converters each provide power in excess of that provided by the larger $MGU_L$ at higher speeds, as indicated by the "gain power" region of the graph at higher motor output speeds. In the example illustrated in FIG. 5, the smaller $MGU_S$ is approximately 40% smaller in size than the larger $MGU_L$, with similar reductions in weight and cost. Generally, reductions in size of a motor-generator unit may be achieved to the extent the smaller motor-generator unit and torque converter can provide sufficient levels of low-end torque, e.g., to meet a torque requirement for lower motor speeds (e.g., "max torque requirement").

Figure 5:
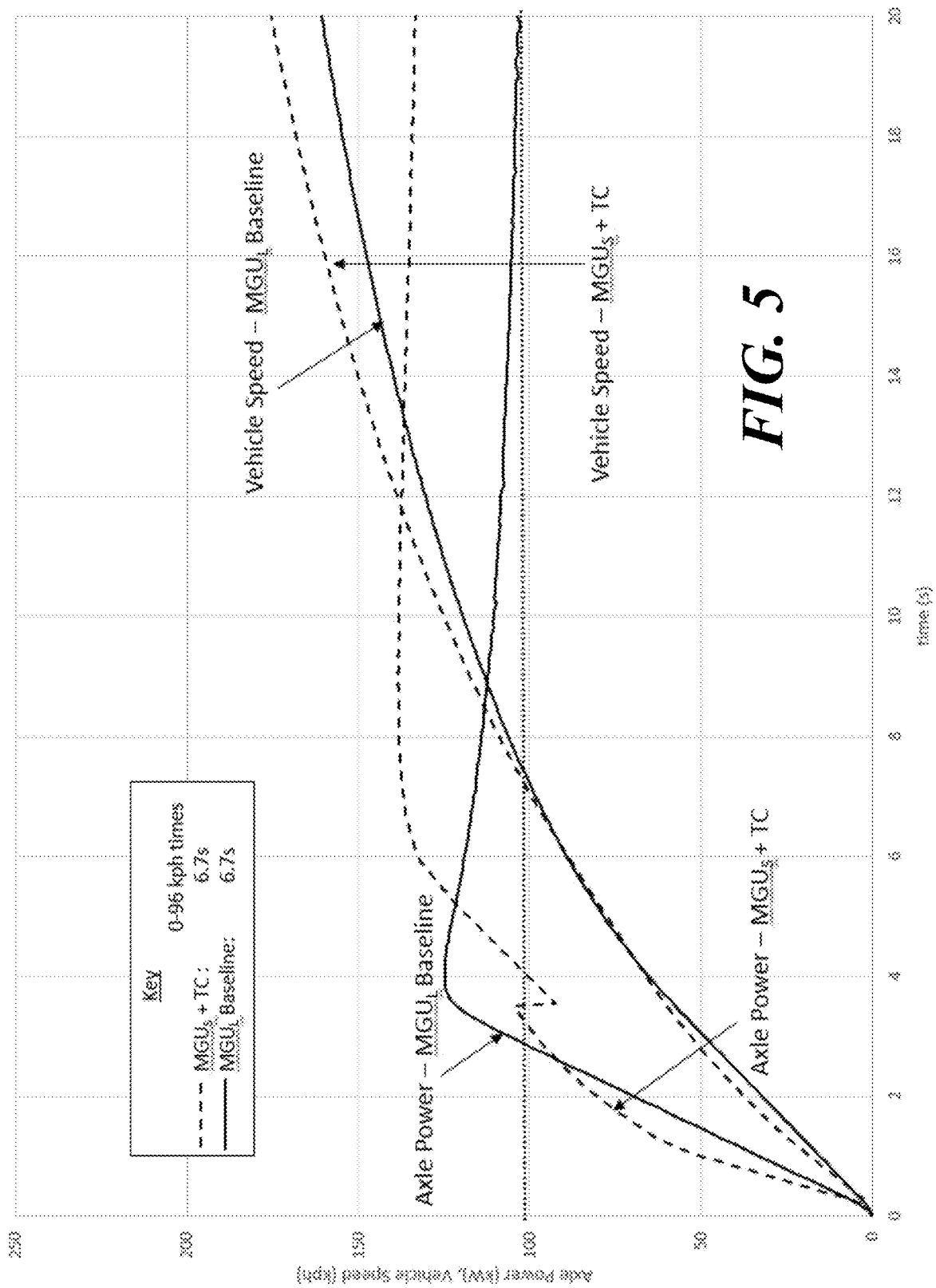
FIG. 5 is a graph of axle power and vehicle speed during an acceleration test for a vehicle having a motor-generator unit consistent with previous approaches compared with a vehicle employing an electric drive unit consistent with the example illustrations herein.

Referring now to FIG. 5, an example of vehicle acceleration performance and axle power output is provided comparing a vehicle having a driveline employing a traditional motor-generator unit for propulsion, with a comparable vehicle employing an electric drive unit consistent with the examples illustrated in FIGS. 1 and 2A-2D. In the example shown in FIG. 5, a vehicle with a larger motor-generator unit $MGU_L$ is compared with the same vehicle with a 25% smaller motor-generator unit $MGU_S$ during a wide-open throttle (WOT) test simulation. As with the previous examples, reductions in motor cost and weight are realized that are approximately proportional to the difference in size.

As can be seen in the comparison of axle power in FIG. 5, the smaller motor-generator unit MGUs and torque converter ("MGUs+TC") provides greater axle power initially, is later surpassed by the larger motor-generator $MGU_L$ for a short time, and ultimately provides greater axle power at high speed. The acceleration performance of the vehicle having the electric drive 100, i.e., $MGU_S+TC$, generally mirrors the difference in axle power, having substantially identical acceleration times (i.e., 0-96 kilometer-per-hour times of 6.7 seconds). Accordingly, while a minimal tradeoff is made in mid-range acceleration and axle power, example electric drives may generally provide both greater low-speed torque and high-speed power in comparison to larger electric motor-generator units.

Examples above have been provided illustrating MGU size reductions of 25% and 40%. Other size reductions may be possible and are generally limited only by the capabilities of the torque converter 104 and requirements for torque output at off-idle or otherwise lower motor speeds. Additionally, it should be noted that peak power requirements of a motor-generator unit for a vehicle at higher speeds are generally not benefited by the torque converter 104, as the torque converter is typically locked or synchronized at higher speeds to reduce/eliminate slip.

Figure 6:
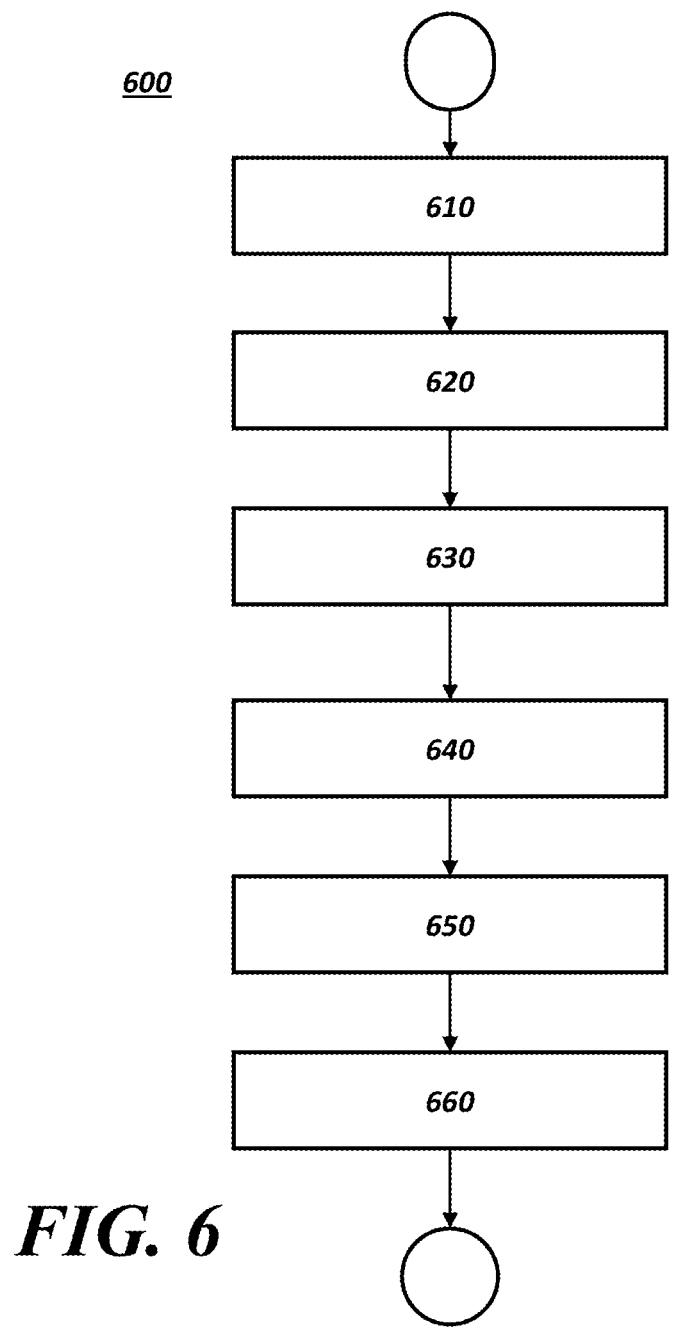
FIG. 6 is a process flow diagram for a method of operating an electric drive unit having a torque converter, according to one example.

Turning now to FIG. 6, an example process 600 for operating an electric drive having a torque converter will be described in further detail. Process 600 may begin at block 610, where an electric motor-generator is provided. For example, as described above, an MGU 102 may be provided that is configured to selectively drive a rotatable shaft, e.g., rotatable shaft 108, with a motor output torque. Additionally, the MGU 102 may be configured to generate power from rotation of the rotatable shaft 108, e.g., which may be stored in a vehicle battery (not shown). Process 600 may then proceed to block 620.

At block 620, an input torque may be applied that is substantially equal to the motor output torque of the rotatable shaft to a torque converter input. For example, as discussed above, MGU 102 may drive the rotatable shaft 108 with a motor output torque, which is transferred to the input 110 of the torque converter 104. The torque converter input 110 may be separated from a torque converter output 112 by a fluid coupling and configured to selectively multiply torque across the torque converter 104.

Proceeding to block 630, a drive unit torque may be applied by the torque converter output to a final drive unit of a vehicle. For example, as described above the output 112 of the torque converter 104 may drive, either directly or indirectly, a final drive unit 202 of a vehicle, e.g., vehicle 200. Accordingly, during operation of the vehicle 200, the electric drive unit 100 may provide propulsion, either alone or in addition to other sources of propulsive power such as an internal combustion engine, for the vehicle 100. Process 600 may then proceed to block 640.

At bock 640, the motor-generator unit may be idled, e.g., during a vehicle stop or prior to launching a vehicle from a stop. For example, upon a vehicle 200 having an electric drive unit 100 coming to a stop, the MGU 102 may continue to turn, i.e., rotating the rotatable shaft 108, thereby keeping the input 110 of the torque converter 104 turning below a stall speed of the torque converter 104. This "idling" of the MGU 102 and torque converter 104 is thus similar in effect to an internal combustion engine that uses a fluid coupling such as that provided by a torque converter to permit idling of a vehicle. The torque converter input 110 may be maintained by the MGU 102 or, for that matter, any other device, at a first rotational speed that is greater than zero.

Proceeding to block 650, torque received at the torque converter input may be multiplied, for example by the torque converter 104, to increase the drive unit torque at the output in at least a first rotational speed range of the electric motor-generator. For example, as discussed above, at relatively low speeds of a vehicle or an MGU 102, a torque converter 104 may multiply torque output by the MGU 102 to provide enhanced acceleration to a vehicle as compared with the MGU 102 alone. The multiplication of torque by the torque converter may be particularly advantageous in launching a vehicle from a stop, or otherwise accelerating at low vehicle and/or speed of the MGU 102. Process 600 may then proceed to block 660.

At block 660, torque from the torque converter input to the torque converter output may be equalized in a second rotational speed range of the electric motor-generator that is higher than the first rotational speed range of the electric motor-generator. For example, as noted above after initial acceleration of vehicle 200 using the electric drive unit 100, at higher motor speeds it may be desirable to lock the input 110 and output 112 of the torque converter 104 to eliminate slippage across the fluid coupling. In one example, the torque converter 104 may employ a clutch 113 that generally fixes the input 110 and output 112 of the torque converter 104 at the same rotational speed. Process 600 may then terminate.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electric drive unit, comprising:
   an electric motor-generator configured to selectively (a) drive a rotor with a motor output torque, the rotor mounted coaxially with the motor-generator, and (b) generate electrical power from rotation of the rotor; and
   a torque converter having an input and an output separated by a fluid coupling, the input mechanically coupled to the rotor such that the rotor and the input are fixed for rotation together, and the motor-generator directly drives the input via the rotor, and an input torque applied to the input is substantially equal to the motor output torque, wherein the fluid coupling is configured to selectively multiply torque received at the input such that a drive unit output torque at the output is selectively increased in at least a predetermined rotational speed range of the electric motor-generator.

2. The electric drive unit of claim 1, wherein the torque converter includes a lockup clutch configured to selectively prevent slip between rotational speeds of the input and the output.

3. The electric drive unit of claim 1, further comprising an output shaft driven by the output of the torque converter.

4. A vehicle comprising the electric drive unit of claim 1, wherein the vehicle is one of a battery-electric vehicle and a fuel cell vehicle, wherein the electric drive unit is configured to provide motive force to a vehicle drivetrain of the vehicle.

5. A vehicle comprising the electric drive unit of claim 1, wherein the vehicle is a hybrid vehicle having an internal combustion engine configured to provide motive force to a vehicle drivetrain of the vehicle or generate electrical power for the vehicle.

6. A vehicle comprising the electric drive unit of claim 1, wherein the electric drive unit is a dedicated powertrain of the vehicle with the torque converter input driven solely by the electric motor-generator.

7. A machine comprising the electric drive unit of claim 1.

8. An electric drive unit, comprising:
   an electric motor-generator configured to selectively (a) drive a rotor with a motor output torque, the rotor mounted coaxially with respect to the motor-generator, and (b) generate electrical power from rotation of the rotor; and
   a torque converter having an input and an output separated by a fluid coupling, the input directly coupled to the rotor and mounted coaxially with the rotor such that the rotor and the input are fixed for rotation together, wherein the fluid coupling is configured to selectively multiply torque received at the input such that a drive unit output torque at the output is selectively increased in at least a predetermined rotational speed range of the electric motor-generator.

9. The electric drive unit of claim 8, wherein the torque converter includes a lockup clutch configured to selectively prevent slip between rotational speeds of the input and the output.

10. The electric drive unit of claim 8, further comprising an output shaft driven by the output of the torque converter.

11. A vehicle comprising the electric drive unit of claim 8, wherein the vehicle is one of a battery-electric vehicle and a fuel cell vehicle, wherein the electric drive unit is configured to provide motive force to a vehicle drivetrain of the vehicle.

12. A vehicle comprising the electric drive unit of claim 8, wherein the vehicle is a hybrid vehicle having an internal combustion engine configured to provide motive force to a vehicle drivetrain of the vehicle or generate electrical power for the vehicle.

13. A machine comprising the electric drive unit of claim 8.

14. The electric drive unit of claim 8, wherein the input and rotor are coupled via a rotatable shaft.

15. A method, comprising:
   (a) providing an electric motor-generator configured to selectively (a) drive a rotor with a motor output torque and (b) generate electrical power from rotation of the rotor, the rotor mounted coaxially with the motor-generator; and
   (b) applying an input torque substantially equal to the motor output torque from the rotor to a torque converter input mechanically coupled to the rotor and fixed for rotation with the rotor such that the motor-generator directly drives the input via the rotor, the torque converter input separated from a torque converter output by a fluid coupling;

(c) transmitting a drive unit torque from the torque converter output to a final drive unit; and (d) multiplying torque received at the torque converter input to increase the drive unit torque at the output in at least a first rotational speed range of the electric motor-generator.

16. The method of claim 15, further comprising equalizing torque from the torque converter input to the torque converter output in a second rotational speed range of the electric motor-generator, the second rotational speed range of the electric motor-generator being different than the first rotational speed range of the electric motor-generator.

17. The method of claim 16, wherein equalizing the torque from the torque converter input to the torque converter output includes temporarily fixing the torque converter input and output for rotation together with a lockup clutch.

18. The method of claim 15, wherein torque is multiplied in step (d) during a vehicle launch from a stop.

19. The method of claim 18, further comprising idling the electric motor during a vehicle stop prior to the vehicle launch.

20. The method of claim 18, further comprising maintaining the torque converter input at a first rotational speed above zero during a vehicle stop prior to the vehicle launch.

* * * * *